United States Patent
Nihof et al.

[15] 3,640,120
[45] Feb. 8, 1972

[54] METHOD AND APPARATUS FOR DETECTING AN INTERFACE BETWEEN TWO LIQUIDS IN A PIPELINE

[72] Inventors: Hendrikus J. Nihof; Albertus C. H. Borsboom, both of Amsterdam, Netherlands

[73] Assignee: Shell Oil Company, New York, N.Y.

[22] Filed: Aug. 7, 1969

[21] Appl. No.: 848,155

[30] Foreign Application Priority Data

Aug. 16, 1968 Netherlands..........................6811659

[52] U.S. Cl....................................................73/53, 73/438
[51] Int. Cl.............................................................G01n 9/26
[58] Field of Search...........................................73/53, 32, 438

[56] References Cited

UNITED STATES PATENTS

| | | | |
|---|---|---|---|
| 2,287,027 | 6/1942 | Cummins, Jr............................73/438 |
| 2,828,479 | 3/1958 | Jackson, Jr...............................73/UX |
| 3,175,403 | 3/1965 | Nelson.....................................73/438 |
| 3,453,868 | 7/1969 | Williams, Jr..............................73/32 |

*Primary Examiner*—Louis R. Prince
*Assistant Examiner*—Joseph W. Roskos
*Attorney*—Theodore E. Bieber and J. H. McCarthy

[57] ABSTRACT

Detecting a change in the composition of a liquid which is being transported through a pipeline, characterized in that the pressure drop is measured simultaneously across two spaced-apart measuring sections in the pipeline. At least one measuring section is horizontal or has a rising slope in the direction of flow. The results of the measurements are compared with each other, if necessary after correction to allow for different circumstances in the measuring sections. A change in the difference between the two results indicates that an interface in the liquid is passing through one of the measuring sections.

3 Claims, 4 Drawing Figures

INVENTORS:
ALBERTUS BORSBOOM
HENDRIKUS NIHOF
BY:

THEIR ATTORNEY

METHOD AND APPARATUS FOR DETECTING AN INTERFACE BETWEEN TWO LIQUIDS IN A PIPELINE

BACKGROUND OF THE INVENTION

The invention relates to a method for detecting a change in the composition of a liquid which is being transported through a pipeline. The invention also relates to an apparatus suitable for carrying out this method. The term "liquid" as used herein is understood to mean a true liquid and, furthermore, dispersed and colloid systems such as emulsions, and suspensions, which are still capable of being pumped.

An important application in practice occurs in the successive pumping through a pipeline of various products such as oil products. In this case the receiving station should be warned well in advance that another product is on its way in order to enable the station to divert it into another line or into another storage vessel. When two products, for example gasoline and gas oil, are pumped successively, there is only a relatively small mixing area between the two products at the usual pumping rates. However, for ease of reference the term interface will be used hereinafter to indicate this mixing area and thus a point in the liquid flowing through a pipeline where the composition of the liquid changes.

For the purpose of detecting an interface several methods are known or in use. It is possible for example to add a tracer to the product stream near the interface. A detector for this tracer would be located near the receiving station. It is also possible to establish the passage of an interface by measuring a characteristic property of the products, such as color, vapor pressure, density, viscosity, dielectric constant, etc. Each of these methods have one or more drawbacks such as high cost, contamination of products, unreliability, disturbance owing to dirt and moisture in a product stream, or complexity.

A new method has now been proposed which obviates these drawbacks to a large extent.

SUMMARY OF THE INVENTION

According to the invention the pressure drop is measured simultaneously across two spaced-apart measuring sections in the pipeline. At least one measuring section is horizontal or has a rising slope in the direction of flow. The results of the measurements are compared with each other, if necessary after correction to allow for different circumstances in the measuring sections. A change in the difference between the two results indicates that an interface in the liquid is passing through one of the measuring sections.

Since the two measuring sections are invariably in the same pipeline and the measuring operations are carried out simultaneously, the same amount of liquid always flows through the measuring sections at the moment of measuring. This is of great importance in evaluating the results since under these conditions the occurrence of a change in the difference can be independent of the rate of flow. However, the rate of flow does influence the magnitude of the difference.

Measuring the pressure drop is simple and reliable and the measuring instruments are inexpensive and durable. Four pressure gauges or two differential pressure gauges are required for determining a difference in the pressure drop.

In order to avoid the necessity of making a number of corrections in the results it is advisable to measure the pressure drop across two sections of the pipeline with equal diameter. It is also preferred to measure across two sections of equal length.

Moreover, it will be advantageous to take appropriate measures to ensure that the temperatures of the liquid in the two sections are equal to each other. This may be achieved in a simple manner, for example by providing the length of pipeline containing the measuring sections with the same type of insulation or by ditching it.

The pressure drop across a measuring section is represented by $$\Delta p = \lambda(L/D)\cdot \tfrac{1}{2}\rho(v^2/g) + \rho\cdot \Delta h$$

wherein $\Delta p$ = pressure drop $\lambda$ = coefficient dependent on the viscosity and on the rate of flow of the liquid
$L$ = length of the measuring section
$D$ = diameter of the measuring section
$\rho$ = density of the liquid
$v$ = average velocity of the liquid stream
$g$ = acceleration due to gravity
$\Delta h$ = difference in height between the end and beginning of the measuring section.

It is assumed that the lines for connecting the pressure gauges or the differential pressure gauges to the measuring sections of the pipeline are not filled with liquid. In practice, however, preference will be given to differential pressure gauges the lines of which for connection to the pipeline are filled with a reference liquid, which is kept separate from the liquid in the pipeline. Such gauges are highly reliable and accurate. Separation between the reference liquid and the liquid in the pipeline is essential because if there is a change of liquid in the pipeline, the liquid in the connecting lines which extend over many meters will be replaced to a very limited extent only. Separation can be effected by means of a diaphragm which is sufficiently sensitive to transmit changes in pressure. The pressure drop across a measuring section then becomes $$\Delta p = \lambda(L/D)\cdot \tfrac{1}{2}\rho v^2/g + \Delta h(\rho - \rho_r)$$

wherein $\rho_r$ is density of the reference liquid. the If the two measuring sections are filled with the same liquid with a density $\rho_1$, the difference in pressure drop across the two measuring sections is $$\Delta p_1 - \Delta p_2 = (\rho_1 - \rho_r)(\Delta h_1 - \Delta h_2).$$

Under these conditions the resistance to flow does not contribute towards the signal $\Delta p_1 - \Delta p_2$. Furthermore, if $\Delta h_1 - \Delta h_2 = 0$, which is the case if the two measuring sections have the same slope—and also if both are horizontal—then the signal is $\Delta p_1 - \Delta p_2 = 0$. If a liquid with a density $\rho_2$ is present in the first measuring section and a liquid with a density $\rho_1$ in the second measuring section, which means that there is an interface between the two measuring sections, then the difference in pressure drop across the two measuring sections is $$\Delta p_1 - \Delta p_2 = \tfrac{1}{2}(L/D)\cdot(v^2/g)(\rho_2\lambda_2 - \rho_1\lambda_1) + [\Delta h_1(\rho_2 - \rho_r) - \Delta h_2(\rho_1 - \rho_r)].$$

In this case, using the method according to the invention the detection of a change in liquid which is being transported through a pipeline produces a change in measuring signal equal to $$(\Delta p_1 - \Delta p_2)_s - (\Delta p_1 - \Delta p_2)\rho_1 = \tfrac{1}{2}(L/C)\cdot(v^2/g)(\rho_2\lambda_2 - \rho_1\lambda_1) + \Delta h_1(\rho_2 - \rho_1)$$

wherein $(\Delta p_1 - \Delta p_2)_s$ = the difference in pressure drop across the two measuring sections if the interface between the two liquids is between the measuring sections and $(\Delta p_1 - \Delta p_2)\rho_1$ = the same difference if the two measuring sections are filled with a liquid with a density $\rho_1$. By making the first measuring section horizontal when viewed in the direction of flow, or giving it a rising slope it is ensured that the static contribution $\Delta h_1(\rho_2 - \rho_1)$ either does not contribute or contributes with the same sign as the flow contribution.

$$\tfrac{1}{2}(L/D)\cdot v^2/g)(\rho_2\lambda_2 - \rho_1\lambda_1).$$

This is of great importance since the static contribution can be very large. By horizontal is also understood a measuring section which has such a small slope that the connections of the lines of the differential pressure gauge to the pipeline may still lie in a horizontal plane. A measuring section has a rising slope if the downstream end of the measuring section is higher than the upstream beginning.

If the measuring section has a negative slope the static contribution contributes with a sign opposite to the flow contribution. As long as the flow contribution predominates, there remains a pressure differential but the differential can also become zero or negative, depending on the rate of flow of the liquid.

The change in the measuring signal after the interface has passed through the first measuring section as represented by the above formula does not contain a static contribution originating from the second measuring section. The reason for this is that the second measuring section is still filled with the same liquid having a density $\rho_1$. Thus, the nature of the slope of the second measuring section has no effect on the change in the measuring signal as discussed so far.

Once the interface has passed the second measuring section, the two sections are filled with the same liquid with a density $\rho_2$. In this case the difference in pressure drop across the two measuring sections becomes $$\Delta p_1 - \Delta p_2 = (\rho_2 - \rho_r)(\Delta h_1 - \Delta h_2).$$

The change in measuring signal as a result of the last-mentioned passage becomes $$(\Delta p_1 - \Delta p_2)_s - (\Delta p_1 - \Delta p_2)_{\rho_2} = \frac{1}{2}(L/D)(v^2/g)(\rho_2\lambda_2 - \rho_1\lambda_1) + \Delta h_2(\rho_2 - \rho_1)$$

wherein $(\Delta p_1 - \Delta p_2)_{\rho_2}$ = the difference in pressure drop across the two measuring sections if both measuring sections are filled with a liquid with a density $\rho_2$.

By making the second measuring section horizontal when viewed in the direction of flow, or giving it a rising slope it is ensured that the static contribution $\Delta h_2(\rho_2 - \rho_1)$ either does not contribute or contributes with the same sign as the flow contribution. As stated previously, this is of great importance. The nature of the slope of the first measuring section has no effect on the change in the measuring signal.

By measuring the pressure drop across measuring sections with each section individually being horizontal or having a rising slope in the direction of flow, it is ensured that the measuring signal, when the interface passes through the second measuring section, returns towards the value which the signal had before the interface passed through the first measuring section.

It may even be advantageous for the second measuring section to have a more steeply rising slope than the first measuring section. In this case the return of the measuring signal can be such that the signal falls below the original value. By selecting a reference liquid with a low density it is ensured that $\rho_1 - \rho_r$ and $\rho_2 - \rho_r$ are invariably positive.

The pressure drop is preferably measured across measuring sections with a length of approximately 30–600 feet each. The measuring sections can be spaced approximately 600–6,000 feet apart. In this case, at the customary liquid rates and tube diameters, a highly useful measuring signal is obtained.

The signals which represent the pressure drops can be used for automatically performing actions such as the operation of valves relating to the arrival of another liquid after the interface. With the aid of known means, such as a subtracting element, a relay or a controller which responds to the presence of a certain differential signal originating from the subtracting element and a switch element for the valves which are to be operated pneumatically or electrically it is possible to pass the newly arriving liquid to the desired destination. In this came the use of means likewise known makes it possible for the relatively small quantity of mixed fluid surrounding the interface to be automatically discharged through a branch on the pipeline before the newly arrived liquid is passed to the desired destination in order to prevent contamination. This may be effected for example by opening the branch on the pipeline for a predetermined period after the interface has been detected and by closing the outlets to storage tanks or lines for clean products. The duration of the period can also be determined or influenced by the period during which the interface is detected, i.e., during the period that the interface is situated between the measuring sections.

In a pipeline having a length of many hundreds of miles the travelling time for a liquid particle is several days. In this case it may be desirable to establish the presence of an interface at more than one location. This can easily and economically be done by means of the method according to the invention. The progress made by the interface can then be satisfactorily followed, for example, at a central station.

The method according to the invention is particularly suitable for use in the successive pumping of two or more liquids through a pipeline. Sometimes it may be advantageous to pump a small amount of a third liquid between two liquids to be pumped successively, which third liquid produces a measurable difference in pressure drop with respect to each of the two other liquids. This mode of operation has the advantage that the arrival of another liquid can be detected with greater certainty if the difference in pressure drop between the two primary liquids should happen to be very small. A disadvantage is that a quantity of a third liquid must be pumped along and separated. This latter operation can incidentally be effected simultaneously with the relatively small quantities of mixed liquids surrounding the interfaces. The quantity of the third liquid is preferably selected to be at least equal to the contents of a measuring section.

For horizontal measuring sections with a diameter of approximately 20 inches, a length of approximately 300 feet each and an average liquid velocity of approximately 4.8 feet the following results are obtained for various products.

| Product | $\rho\lambda\rho$ | $\Delta p(mm.H_2O)$ |
| --- | --- | --- |
| light gasoline fraction | 1.13 | 289 |
| naphtha | 1.44 | 368 |
| super gasoline | 1.23 | 314 |
| normal gasoline | 1.20 | 308 |
| turbine fuel I | 1.37 | 350 |
| turbine fuel II | 1.29 | 330 |
| gas oil | 1.50 | 385 |

The measuring range of a normal differential pressure gauge is for example, 500 mm. $H_2O$. Such a gauge can unequivocally indicate a pressure difference of 3 mm., so that it is possible for example to indicate the passage of an interface between normal and super gasoline. If the first measuring section has a positive slope of 0.5 percent the total change in signal becomes for example 86 mm. $H_2O$ after the interface between naptha and kerosene has passed the first measuring section, this is due to a static contribution of 48 mm. and a flow contribution of 38 mm. Under identical conditions a total change in signal of 11 mm. $H_2O$ is obtained for super gasoline/normal gasoline, i.e., a static contribution of 5 mm. $H_2O$ in addition to the flow contribution of 6 mm. $H_2O$. Thus it is clear that the static contribution can be very important.

The method according to the invention as well as an apparatus suitable for carrying out the method according to the invention will now be elucidated with reference to some Figures.

BRIEF DESCRIPTION OF THE DRAWING

In FIG. 1 the reference numeral 1 denotes a length of pipeline. Across a section 2 the pressure drop is measured by means of a differential pressure gauge 3 which for this purpose is connected by means of tubes to the ends of the section 2. The same procedure is followed across a section 4 by means of a differential pressure gauge 5. The length of the sections 2 and 4 can be 300 feet, and the length of the intermediate section 6 can be 3,000 feet. The two measured values of the gauges 3 and 5 are passed to a subtracting element 7, the result of which is shown on a meter 8.

In FIG. 2 the course of $\Delta p_1 - \Delta p_2$ is plotted as a function of that time for two measuring sections which are both horizontal or equal in slope. Part $a$ of the graph shows that both measuring sections are filled with a a second liquid and part $b$ shows that the interface is in the section 6 of FIG. 1. In this case $\Delta p_1 = \Delta p_2$ during part $c$ is equal to that during part $a$.

In FIG. 3 the designations $a$, $b$ and $c_1$ through $c_4$ have meanings corresponding to those of FIG. 2. There are now four parts $c$, $c_1$ showing the $\Delta p_1 - \Delta p_2$ value if the two measuring sections are equal in slope or if they are horizontal. If the slope of the second measuring section rises more steeply than that of the first measuring section, $c_2$ is obtained. With a very definite downward slope of the second measuring section it is under given circumstances possible to obtain a value for $\Delta p_1 - \Delta p_2$ which is represented by $c_3$ and equal to $b$. With a more steeply descending slope of the second measuring section $c_4$ is obtained. The situation is preferably selected as represented by $c_1$ or $c_2$.

In FIG. 4 the reference numeral 9 is a length of a pipeline. Across a section 10 the pressure drop is measured by means of a differential pressure gauge 11, which for this purpose is connected to the ends of the section 10 by means of lines 12 and 13. The line 12 is short and filled with the liquid from the pipeline. The line 13 has the same length as the measuring section 10 and is filled with a reference liquid. The end of the line 13 is connected to the pipeline 9 by way of a diaphragm 14. The same applies to a second measuring section 15, across which the pressure drop is measured by means of a differential pressures gauge 16 which is connected to the measuring section 15 through lines 17 and 18 and a diaphragm 19.

Figure 1:
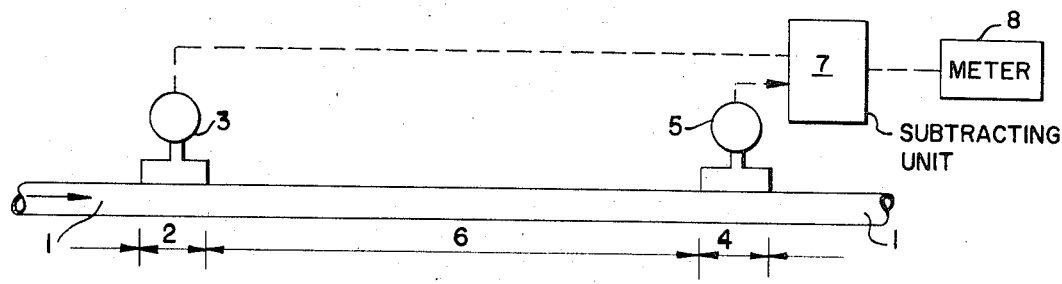
FIG. 1 shows a length of pipeline with two measuring sections.
Figure 2:
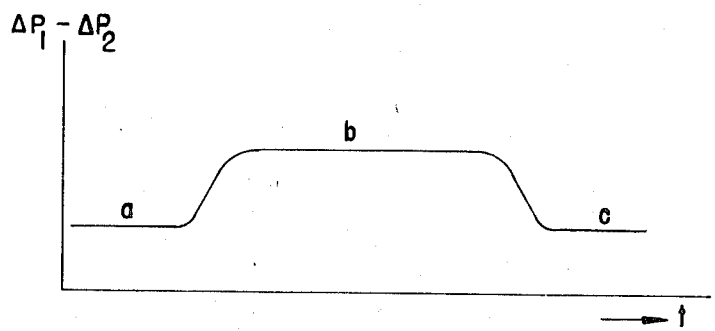
FIG. 2 is a graph of the difference in differential pressures in a pipeline as a function of time.
Figure 3:
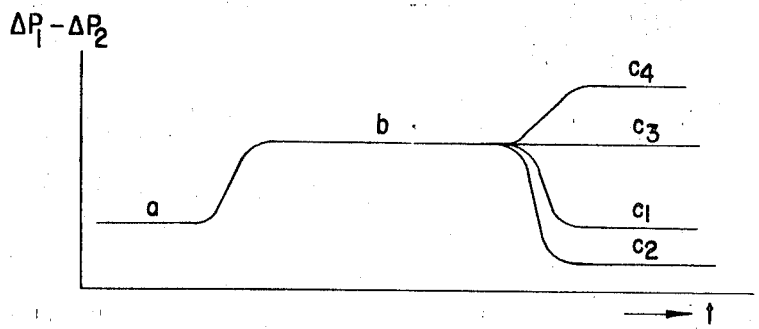
FIG. 3 is a graph of the difference in differential pressures in a pipeline as a function of time and as a function of the slope of the pipe.
Figure 4:
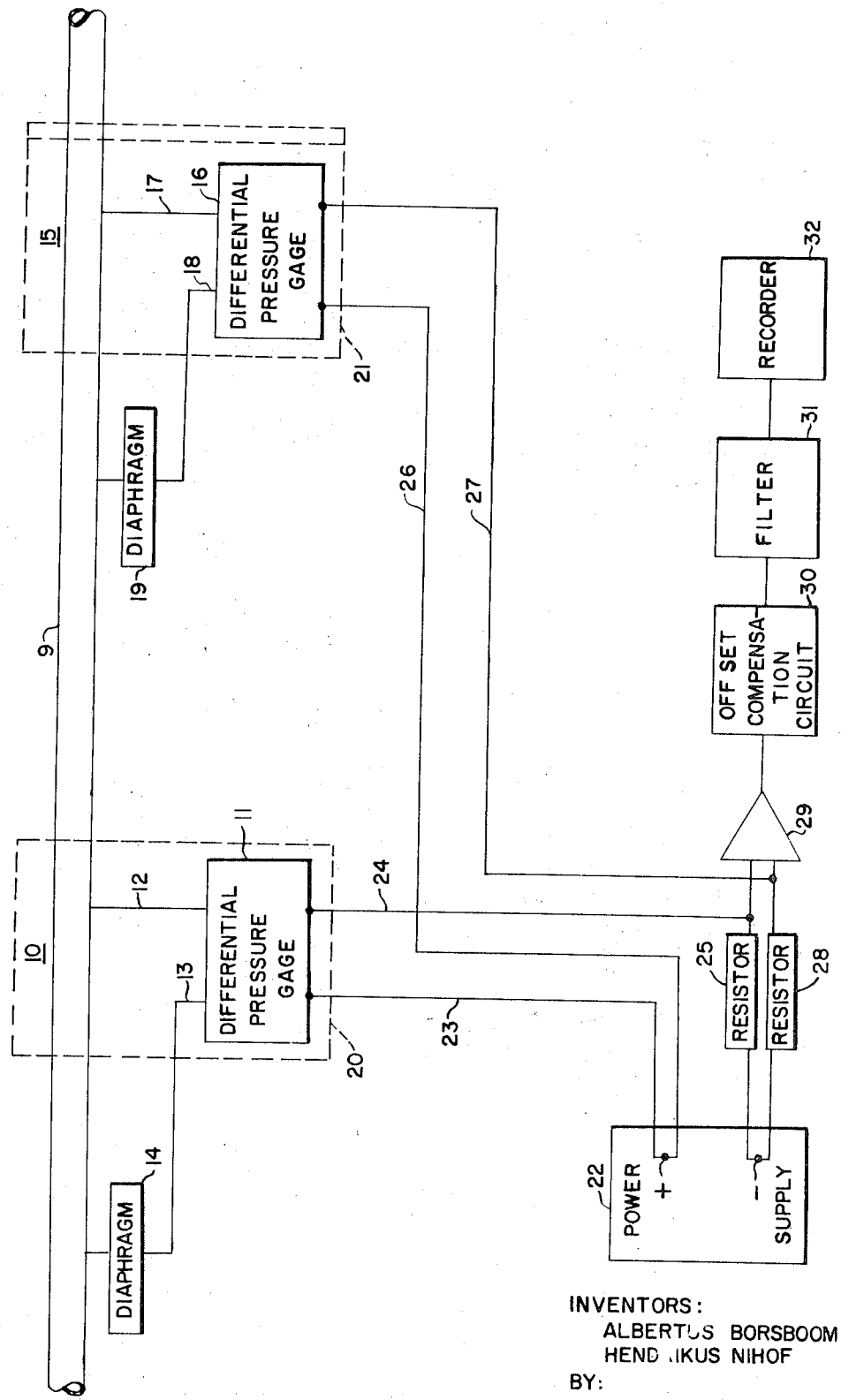
FIG. 4 illustrates an apparatus for carrying out the method of the present invention.

In order to minimize the influence of the ambient temperature on the output signal of the differential pressure gauges, the differential pressure gauges are placed in a covered pit, indicated by dotted lines 20 and 21.

The differential pressure gauge 11 is connected to a power supply by way of electric lines 23 and 24. A current proportional to the measured pressure differential passes through lines 23 and 24 and generates a corresponding voltage difference across a load resistor 25. In the same way the differential pressure gauge 16 is connected to the power supply 22 by way of lines 26 and 27 and by way of a load resistor 28. The voltage difference across resistors 25 and 28 are subtracted from each other in a differential amplifier 29. The common power supply 22 is deliberately used for the differential pressure gauges 11 and 16 so that any change in the supply voltage and a consequent change in the output signals of the differential pressure gauges 11 and 16 will have no effect on the output voltage of the differential amplifier 29.

Owing to small differences in the load resistors 25 and 28, in the adjustment of the differential pressure gauges 11 and 16 or in the length or slope of the measuring sections 10 and 15, there is a possibility that differential amplifier 29 will generate an output signal even through the same liquid is flowing through 10 and 15. This zero variation, called an offset, is corrected by a simple circuit 30, the zero adjustment being effected regularly and possibly automatically as long as it is certain that the same liquid flows through 10 and 15. This has the effect of eliminating the influence of the always present slow drift of the equipment, in particular of the differential pressure gauges 11 and 16.

In addition, the output signal of 30 can also contain components, for example with frequencies in excess of 0.1 cycle per second, which do not originate from the passage of an interface. These components are suppressed in a low-passage filter 31 so that only the signal originating from the passage of an interface is recorded on a recorder 32.

We claim as our invention:

1. An apparatus for detecting a change in the composition of a liquid being transported in a pipeline to detect the passage of an interface between two different liquids, said apparatus comprising:

a first differential pressure gauge connected across a first section of the pipeline, one side of said first gauge being connected to said pipeline by a short line filled with said liquid, the other side of said first gauge being connected to said pipeline by a long line equal in length to said first section and filled with a reference liquid, said long line being isolated from the liquid in said pipeline by a diaphragm, said first gauge generating a first signal proportional to the pressure drop across said first section;

a second differential pressure gauge connected across a second section of the pipeline remotely spaced from said first section of the pipeline, one side of said second gauge being connected to said pipeline by a short line filled with said liquid, the other side of said second gauge being connected to said pipeline by a long line equal in length to said second section and filled with a reference fluid, said long line being isolated from the liquid in said pipeline by a diaphragm, said second gauge generating a signal proportional to the pressure drop across said second section.

a differential amplifier operatively connected to supply an output signal, proportional to the difference between said first signal and said second signal.

2. The apparatus of claim 1 further characterized by a filter means connected to the output of said differential amplifier, said filter means being adapted to reject high frequency signals.

3. The apparatus of claim 1 further characterized by a recorder means connected to the output of said filter means and adapted to record the output signal therefrom.

* * * * *